US012798977B2

(12) United States Patent
Vu et al.

(10) Patent No.: US 12,798,977 B2
(45) **Date of Patent: *Nov. 17, 2026**

(54) METHOD FOR THE MANUFACTURE OF GRAPHENE OXIDE FROM EXPANDED KISH GRAPHITE

(71) Applicant: ArcelorMittal, Luxembourg (LU)

(72) Inventors: Thi Tan Vu, Oviedo (ES); Roberto Suarez Sanchez, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 800 days.

This patent is subject to a terminal disclaimer.

(21) Appl. No.: 17/611,249

(22) PCT Filed: May 12, 2020

(86) PCT No.: PCT/IB2020/054458

§ 371 (c)(1),
(2) Date: Nov. 15, 2021

(87) PCT Pub. No.: WO2021/001700

PCT Pub. Date: Jan. 7, 2021

(65) Prior Publication Data

US 2022/0212934 A1 Jul. 7, 2022

(30) Foreign Application Priority Data

May 16, 2019 (WO) .................. PCT/IB2019/054056

(51) Int. Cl.
*C01B 32/198* (2017.01)
*B01D 21/26* (2006.01)

(52) U.S. Cl.
CPC .......... *C01B 32/198* (2017.08); *B01D 21/262* (2013.01); *C01P 2002/08* (2013.01)

(58) Field of Classification Search
None
See application file for complete search history.

(56) References Cited

U.S. PATENT DOCUMENTS 2,798,878 A * 7/1957 Hummers, Jr. ......... C01B 32/23 562/410
3,404,061 A * 10/1968 Bochman ................ F28F 21/02 428/323
4,075,114 A * 2/1978 Ishikawa ............... C04B 35/536 427/113
9,284,193 B2 * 3/2016 Cruz-Silva ............ D01D 5/426
11,390,529 B2 * 7/2022 Vu ........................ C01B 32/198
11,702,341 B2 * 7/2023 Vu ........................ C01B 32/194 423/415.1
12,404,179 B2 * 9/2025 Vu ........................ C01B 32/184
2013/0261352 A1 10/2013 Zhou et al.
2015/0071844 A1 3/2015 Kim et al.
2015/0111449 A1 * 4/2015 Cruz-Silva ......... B01D 39/2065 428/688
2016/0298244 A1 10/2016 Abdelkader et al.
2016/0311688 A1 10/2016 Zhang et al.
2017/0217775 A1 8/2017 Sohn et al.
2018/0327268 A1 11/2018 Lu et al.
2018/0339906 A1 11/2018 Lu et al.
2021/0179434 A1 6/2021 Vu et al.
2021/0206646 A1 7/2021 Vu et al.
2021/0221687 A1 7/2021 Vu et al.
2021/0221688 A1 7/2021 Vu et al.
2021/0230000 A1 7/2021 Vu et al.
2021/0230003 A1 7/2021 Vu et al.

FOREIGN PATENT DOCUMENTS

CN 102020270 A 4/2011
CN 103408000 A 11/2013
CN 104909348 A 9/2015
CN 107001047 A 8/2017
CN 109534335 A 3/2019
JP 2013544223 A 12/2013
JP 2017501965 A 1/2017
JP 2017502168 A 1/2017
JP 2018534224 A 11/2018
KR 101109961 B1 * 2/2012 ........... C01B 32/192
KR 20160018257 2/2016
KR 20170061121 A 6/2017
KR 20180059492 6/2018
WO WO2009013931 A1 1/2009
WO WO 2017/027731 A1 2/2017
WO WO2018105570 A1 6/2018
WO WO2018/178842 A1 10/2018
WO WO2018178845 A1 10/2018
WO WO2018218339 A1 12/2018
(Continued)

OTHER PUBLICATIONS

Machine translation for KR101109961B1 (Year: 2012).*
(Continued)

*Primary Examiner* — Michael Forrest
(74) *Attorney, Agent, or Firm* — Davidson Kappel LLC

(57) ABSTRACT

A method is provided for the manufacture of graphene oxide from kish graphite including: A. The provision of kish graphite, B. Optionally, a pre-treatment of kish graphite, C. The intercalation of kish graphite with a persulfate salt and an acid at room temperature to obtain intercalated kish graphite, D. The expansion of the intercalated kish graphite to obtain expanded kish graphite and E. An oxidation step of the expanded kish graphite to obtain graphene oxide.

22 Claims, 1 Drawing Sheet

(56) References Cited

FOREIGN PATENT DOCUMENTS

| | | | |
|---|---|---|---|
| WO | WO 2019/220227 | A1 | 11/2019 |
| WO | WO 2019220228 | A1 | 11/2019 |
| WO | WO 2020/230010 | A1 | 11/2020 |

OTHER PUBLICATIONS

Sun et al (Mass production of graphene oxide from expanded graphite, Mater Letters, 109, (2013) pp. 207-210) (Year: 2013).*

Jiang et al."Preparation of high-quality graphene using triggered microwave reduction under an air atmosphere", Journal of Materials Chemistry C, (2018), vol. 6, ISSN 0004961568, pp. 1829-1835.

Wu, Zhong-Shuai, et al. "Synthesis of high-quality graphene with a pre-determined No. of layers." Carbon 47.2 (2009): 493-499.

Youn, Duck Hyun, et al. "Fabrication of graphene-based electrode in less than a minute through hybrid microwave annealing." Scientific reports 4.1 (2014): 5492.

Iskandar, Ferry, et al. "Microwave-assisted reduction method under nitrogen atmosphere for synthesis and electrical conductivity improvement of reduced graphene oxide (rGO)." RSC advances 7.83 (2017): 52391-52397.

Liu, Ting, et al. "One-step room-temperature preparation of expanded graphite." Carbon 119 (2017): 544-547.

See Search Report of PCT/IB2020/054458 dated Aug. 8, 2020.

Jung-Chul An et al.: "Preparation of Kish graphite-based graphene nanoplatelets by GIC (graphite intercalation compound) via process," Journal of Industrial and Engineering Chemistry 26 (2015) 55- 60, Jun. 1, 2015.

Aunkor, M. T. H., et al. "The green reduction of graphene oxide." Rsc Advances 6.33 (2016): 27807-27828.

Aliyev, Elvin, et al. "Structural characterization of graphene oxide: Surface functional groups and fractionated oxidative debris." Nanomaterials 9.8 (2019): 1180.

Ganguly, Abhijit, et al. "Probing the thermal deoxygenation of graphene oxide using high-resolution in situ X-ray-based spectroscopies." The Journal of Physical Chemistry C 115.34 (2011): 17009-17019.

Lin, Shan, et al. "Room-temperature intercalation and- 1 000-fold chemical expansion for scalable preparation of high-quality graphene." Chemistry of Materials 28.7 (2016): 2138-2146.

Liu, Yuhang, et al. "Largely enhanced oxidation of graphite flakes via ammonium persulfate-assisted gas expansion for the preparation of graphene oxide sheets." Carbon 146 (2019): 618-626.

* cited by examiner

METHOD FOR THE MANUFACTURE OF GRAPHENE OXIDE FROM EXPANDED KISH GRAPHITE

The present invention relates to a method for the manufacture of graphene oxide from expanded Kish graphite. In particular, graphene oxide will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron-making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene-based materials. Usually, graphene-based materials include: graphene, graphene oxide, reduced graphene oxide or nanographite.

Graphene oxide is composed of one or few layers of graphene sheets containing oxygen functional groups. Thanks to its interesting properties such as a high thermal conductivity and a high electrical conductivity, graphene oxide has many applications as mentioned above. Moreover, the presence of oxygen functional groups makes it hydrophilic and therefore it can be easily dispersed in water.

SUMMARY OF THE INVENTION

Usually, graphene oxide is synthesized based on Hummer Method comprising the following steps:

- the creation of a mixture of Kish graphite, sodium nitrate ($NaNO_3$) and sulfuric acid ($H_2SO_4$),
- the addition of sodium or potassium permanganate ($KMnO_4$) as oxidizing agent to oxidize graphite into graphite oxide and
- the mechanical exfoliation of graphite oxide into monolayer or a few layers of graphene oxide.

The patent application publication WO2018/178842 discloses a method for the manufacture of graphene oxide from kish graphite comprising:

- A. The provision of kish graphite,
- B. A pre-treatment step of said kish graphite comprising the following successive sub-steps:
  - i. A sieving step wherein the kish graphite is classified by size as follows:
    - a) Kish graphite having a size below 50 μm,
    - b) Kish graphite having a size above or equal to 50 μm, the fraction a) of kish graphite having a size below 50 μm being removed,
  - ii. A flotation step with the fraction b) of kish graphite having a size above or equal to 50 μm,
  - iii. An acid leaching step wherein an acid is added so that the ratio in weight (acid amount)/(kish graphite amount) is between 0.25 and 1.0,
  - iv. Optionally, the kish graphite is washed and dried and
- C. An oxidation step of the pre-treated kish graphite in order to obtain graphene oxide with an acid, sodium nitrate and an oxidizing agent.

Nevertheless, when the oxidation step is performed with sodium nitrate ($NaNO_3$), toxic gases are produced leading to a polluting method. Moreover, the oxidation time is very long (around 3 hours).

The patent application PCT/IB2019/052804 now published as WO 2019/220227 A1 discloses a method for the manufacture of graphene oxide from kish graphite comprising:

- A. The provision of kish graphite,
- B. A pre-treatment step of said kish graphite comprising the following successive sub-steps:
  - i. A sieving step wherein the kish graphite is classified by size as follows:
    - a) Kish graphite having a size below 50 μm,
    - b) Kish graphite having a size above or equal to 50 μm, the fraction a) of kish graphite having a size below 50 μm being removed,
  - ii. A flotation step with the fraction b) of kish graphite having a size above or equal to 50 μm,
  - iii. An acid leaching step wherein an acid is added so that the ratio in weight (acid amount)/(kish graphite amount) is between 0.25 and 1.0,
  - iv. Optionally, the kish graphite is washed and dried and
- C. An oxidation step of the pre-treated kish graphite in order to obtain graphene oxide with an acid, ammonium nitrate ($NH_4NO_3$) and an oxidizing agent.

However, although the method using $NH_4NO_3$ is less polluting than the method using $NaNO_3$, there is a need to further provide an even less polluting method and to reduce the energy consumption.

Additionally, although the oxidation time is shorter using $NH_4NO_3$, i.e. 1 hour and 30 minutes, compared to the oxidation time of the method using $NaNO_3$, i.e. 3 hours, there is still a need to reduce the oxidation time and therefore to improve the productivity of the synthesis of graphene oxide.

It is an object of the present invention to provide an industrial method to obtain graphene oxide having good quality in the shortest time possible. Additionally, the purpose of the invention is to provide a less polluting method for the manufacture of graphene oxide from Kish graphite compared to the prior art methods.

The present invention provides a method for the manufacture of graphene oxide from kish graphite comprising:

- A. The provision of kish graphite,
- B. Optionally, a pre-treatment of kish graphite,
- C. The intercalation of kish graphite with a persulfate salt and an acid at room temperature to obtain intercalated kish graphite,
- D. The expansion of the intercalated kish graphite at room temperature to obtain expanded kish graphite and
- E. An oxidation step of the expanded kish graphite to obtain graphene oxide.

The method may also have the optional features listed below, considered individually or in combination:

- In step B), the pre-treatment of kish graphite comprises the following successive sub-steps:
  - A sieving step wherein the kish graphite is classified by size as follows:
    - Kish graphite having a size below 50 μm,
    - Kish graphite having a size above or equal to 50 μm, the fraction a) of kish graphite having a size below 50 μm being removed,
  - A flotation step with the fraction b) of kish graphite having a size above or equal to 50 μm, An acid leaching step wherein an acid is added so that the ratio in weight (acid amount)/(kish graphite amount) is between 0.25 and 1.0, Optionally, the kish graphite is washed and dried, In step C), the ratio in weight of persulfate salt with respect to kish graphite is between 1 and 8, In step C), the ratio in weight of the acid with respect to kish graphite is between 2 and 8, In step C), the persulfate salt is chosen from: Sodium persulfate ($Na_2S_2O_8$), Ammonium persulfate ($(NH_4)_2S_2O_8$) and Potassium persulfate ($K_2S_2O_8$) or a mixture thereof, In step C), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof, In step D), the expansion is naturally performed by leaving the kish graphite, the persulfate salt and the acid at room temperature in an open vessel, Step E) comprises the following successive sub-steps:

The mixture of the expanded kish graphite with an acid, an oxidizing agent and optionally a salt, The addition of a chemical element to stop the oxidation reaction, the separation of graphite oxide from the mixture obtained in step E.ii), The exfoliation of graphite oxide into graphene oxide, In step E.i), the salt is a nitrate salt chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof, In step E.i), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof, In step E.i), the oxidizing agent is chosen from: potassium permanganate, $H_2O_2$, $O_3$, $H_2S_2O_8$, $H_2SO_5$, $KNO_3$, NaClO or a mixture thereof, In step E.ii), the chemical element used to stop the oxidation reaction is chosen from: an acid, non-deionized water, deionized water, $H_2O_2$ or a mixture thereof, When at least two chemical elements are chosen to stop the reaction, they are used successively or simultaneously, In step E.ii), the mixture obtained in step E.i) is gradually pumped into the chemical element used to stop the oxidation reaction, In step E.iii), the graphite oxide is separated by centrifugation, decantation, distillation or filtration, In step E.iv), the exfoliation is performed by using ultrasound, mechanical agitator, sieve shaker or thermal exfoliation.

The following terms are defined:

Graphene oxide means one or a few layer(s) of graphene comprising oxygen functional groups including ketone groups, carboxyl groups, epoxy groups and hydroxyl groups, room temperature means between 0 and 45° C. at atmospheric pressure.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following figures.

DETAILED DESCRIPTION

Figure 1:
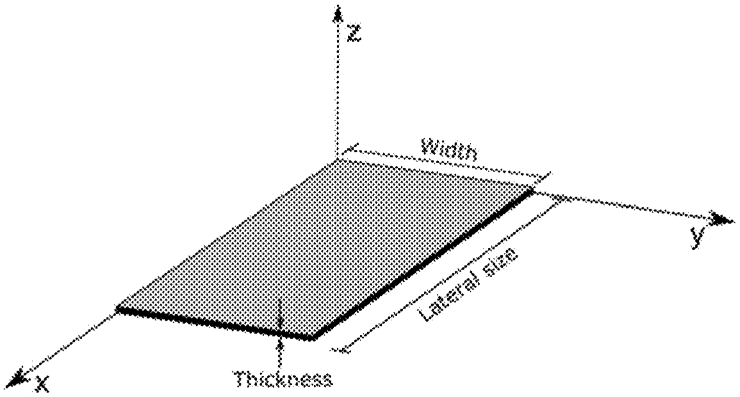
FIG. 1 illustrates an example of one layer of graphene oxide according to the present invention.

The invention relates to a method for the manufacture of graphene oxide from kish graphite comprising:

A. The provision of kish graphite,

B. Optionally, a pre-treatment of kish graphite,

C. The intercalation of kish graphite with a persulfate salt and an acid at room temperature to obtain intercalated kish graphite, D. The expansion of the intercalated kish graphite at room temperature to obtain expanded kish graphite and E. An oxidation step of the expanded kish graphite to obtain graphene oxide.

The method according to the present invention allows for the production of graphene oxide having good quality. Moreover, the method including the intercalation at room temperature, the expansion at room temperature and the oxidation into graphene oxide, it is easy to implement at industrial scale and it is less polluting than methods of the prior art.

Without willing to be bound by any theory, it is believed that during the expansion, the persulfate salt acts like an oxidant to oxidize the edges of the kish graphite layers. Since the persulfate salt is an important oxygen donor, the intercalation gap between two kish graphite layers is further improved allowing the acid to enter more easily between the kish graphite layers. At the same time, a certain amount of persulfate salt can be dragged by the acid in the kish graphite interlayers. It is believed that the persulfate salt dragged in the interlayers will decompose and release $O_2$ gas causing an instantaneous pressure in the kish graphite interlayers making an exponential expansion of graphite at room temperature. The energy consumption is thus reduced and expanded kish graphite is easily obtained.

Moreover, it is believed that using expanded kish graphite according to the present invention significantly reduces the oxidation time compared to the methods for the manufacture of graphene oxide of the prior art. Indeed, it is believed that since there is a higher expansion volume, it is easier to oxidize the kish graphite layers since the gap between two kish graphite layers is higher using the persulfate salt and the acid. Thus, the oxidation time is significantly reduced and graphene oxide is easily obtained.

Preferably, in step A), the Kish graphite is a residue of the steelmaking process. For example, it can be found in a blast furnace plant, in an ironmaking plant, in a steelmaking plant, in the torpedo car and during ladle transfer.

Preferably, in step B), the pre-treatment of kish-graphite comprises the following successive sub-steps:

i. A sieving step wherein the kish graphite is classified by size as follows:

a) Kish graphite having a size below 50 μm, b) Kish graphite having a size above or equal to 50 μm, the fraction a) of kish graphite having a size below 50 μm being removed, ii. A flotation step with the fraction b) of kish graphite having a size above or equal to 50 μm, iii. An acid leaching step wherein an acid is added so that the ratio in weight (acid amount)/(kish graphite amount) is between 0.25 and 1.0, iv. Optionally, the kish graphite is washed and dried.

Without willing to be bound by any theory, it seems that when the kish graphite is pre-treated with the method according to the present invention, it allows for the production of graphene oxide having improved quality since the pre-treated Kish graphite has a high purity. Indeed, the Kish graphite obtained after step B) has a purity of at least 90%. Moreover, the pre-treatment step B) is easy to implement at industrial scale and is more environmentally friendly than conventional methods.

In step B.i), the sieving step can be performed with a sieving machine.

After the sieving, the fraction a) of Kish graphite having a size below 50 μm is removed. Indeed, without willing to bound by any theory, it is believed that the kish graphite having a size below 50 μm contains a very small quantity of graphite, for example less than 10%.

Preferably in step B.ii), the flotation step is performed with a flotation reagent in an aqueous solution. For example, the flotation reagent is a frother selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 μm is removed and in step B.ii), the fraction b) of kish graphite has a size above or equal to 55 μm. More preferably, in step B.i), the fraction a) of kish graphite having a size below 60 μm is removed and in step B.ii), the fraction b) of kish graphite has a size above or equal to 60 μm.

Preferably, in steps B.i) and B.ii), the fraction b) of kish graphite has a size below or equal to 300 μm, any fraction of kish graphite having a size above 300 μm being removed before step B.ii).

More preferably in steps B.i) and B.ii), the fraction b) of kish graphite has a size below or equal to 275 μm, any fraction of kish graphite having a size above 275 μm being removed before step B.ii).

Advantageously, in steps B.i) and B.ii), the fraction b) of kish graphite has a size below or equal to 250 μm, any fraction of kish graphite having a size above 250 μm being removed before step B.ii).

In step B.iii), the (acid amount)/(kish graphite amount) ratio in weight is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: hydrochloric acid, phosphoric acid, sulfuric acid, nitric acid or a mixture thereof.

The pre-treated Kish graphite obtained after step B) of the method according to the present invention has a size above or equal to 50 μm. The pre-treated Kish graphite has a high purity, i.e. at least of 90%. Moreover, the degree of crystallinity is improved compared to conventional methods allowing higher thermal and electrical conductivities and therefore higher quality.

Once kish graphite has been provided and optionally pre-treated, it is intercalated with a persulfate salt and an acid at room temperature to obtain intercalated kish graphite (step C).

Preferably, in step C), the ratio in weight of persulfate salt with respect to kish graphite is between 1 and 8, more preferably between 1 and 6 and advantageously between 1 and 5. Indeed, if the ratio is below 1, there is a risk that the intercalation, and thus the expansion, is not complete. If the ratio is above 8, there is a risk of reagent waste.

Preferably, in step C), the ratio in weight of the acid with respect to kish graphite is between 2 and 8, more preferably between 4 and 8. Indeed, if the ratio of the acid with respect to kish graphite is below 2, there is a risk that only a part of kish graphite is expanded. If the ratio of the acid with respect to kish graphite is above 8, there is a risk that the expansion occurs very slowly and that the volume expansion decreases. It is believed that the acid in excess prevents the persulfate salt from being dragged in the kish graphite interlayer. Therefore, it prevents the release of oxygen from the decomposition of the persulfate salt and thus the exponential expansion of kish graphite.

Preferably, in step C), the persulfate salt is chosen from the ones containing the peroxydisulfate anion $S_2O_8^{2-}$ More preferably, the persulfate salt is chosen from: Sodium persulfate ($Na_2S_2O_8$), Ammonium persulfate ($(NH_4)_2S_2O_8$) and Potassium persulfate ($K_2S_2O_8$) or a mixture thereof.

Preferably, in step C), the acid is a strong acid. More preferably, the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof.

Preferably, in step C), kish graphite is first mixed with the acid and then the persulfate salt is added.

Preferably step C) lasts from 2 to 30 minutes.

Once kish graphite has been intercalated, it is expanded (step D).

Preferably, in step D), the expansion is naturally performed by leaving the kish graphite, the persulfate salt and the acid at room temperature in an open vessel. For example, the components are in an opened bowl, opened glassware, opened lab reactor or opened pilot reactor.

Preferably, step D) lasts from 2 to 60 minutes.

Once kish graphite has been expanded, it is oxidized to obtain graphene oxide (step E).

Preferably, step E) comprises the following successive sub-steps:

i. The mixture of the expanded kish graphite, an acid, an oxidizing agent and optionally a salt,
ii. The addition of a chemical element to stop the oxidation reaction,
iii. the separation of graphite oxide from the mixture obtained in step E.ii),
iv. The exfoliation of graphite oxide into graphene oxide.

Thanks to the expanded kish graphite, the oxidation time is significantly reduced compared to the oxidation steps of the prior art. Indeed, the oxidation time can be as short as 10 minutes compared to oxidation times of several hours for the oxidation steps of the prior art. Preferably the oxidation of the expanded kish graphite with an acid, an oxidizing agent and optionally a salt lasts from 5 to 15 minutes. Moreover, it seems that the oxidation of the expanded kish graphite without any salt allows for an even shorter oxidation time. The ability to remove the salt from the oxidation step significantly limits pollution. Thus, preferably, the expanded kish graphite is mixed with an acid and an oxidizing agent, without any salt. In other words, the mixture of step E.i) preferably consists of kish graphite, acid and oxidizing agent.

Optionally, in step E.i), the salt is chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof. Preferably the ratio in weight of salt with respect to the kish graphite is between 0.2 and 2.

Preferably, in step E.i), the acid is chosen from: $H_2SO_4$, HCl, $HNO_3$, $H_3PO_4$, $C_2H_2Cl_2O_2$ (dichloroacetic acid), $HSO_2OH$ (alkylsulfonic acid) or a mixture thereof.

Preferably, in step E.i), the oxidizing agent is chosen from: potassium permanganate ($KMnO_4$), $H_2O_2$, $O_3$, $H_2S_2O_8$, $H_2SO_5$, $KNO_3$, NaClO or a mixture thereof. Preferably the ratio in weight of oxidizing agent with respect to kish graphite is between 2 and 10.

Then, advantageously in step E.ii), the chemical element used to stop the oxidation reaction is chosen from: an acid, non-deionized water, deionized water, $H_2O_2$ or a mixture thereof.

In a preferred embodiment, when at least two chemical elements are used to stop the reaction, they are used successively or simultaneously. Preferably, deionized water is used to stop the reaction and then $H_2O_2$ is used to eliminate the rest of the oxidizing agent. In another preferred embodiment, hydrochloric acid is used to stop the reaction and then $H_2O_2$ is used to eliminate the rest of the oxidizing agent. In another preferred embodiment, $H_2O_2$ is used to stop the reaction and eliminate the rest of the oxidizing agent by this following reaction:

$$2KMnO_4+H_2O_2+3H_2SO_4=2MnSO_4+O_2+K_2SO_4+4H_2O.$$

Without willing to be bound by any theory, it seems that when the chemical element to stop the reaction is added into the mixture, there is a risk that this addition is too exothermic resulting in explosion or splashing. Thus, preferably, the element used to stop the reaction is slowly added into the mixture obtained in step E.i). More preferably, the mixture obtained in step E.i) is gradually pumped into the element used to stop the oxidation reaction. For example, the mixture obtained in step E.i) is gradually pumped into deionized water to stop the reaction.

In step E.iii), the graphite oxide is separated from the mixture obtained in step E.ii). Preferably, the graphene oxide is separated by centrifugation, by decantation or filtration.

Optionally, the graphite oxide is washed. For example, the graphene oxide is washed with an element chosen from among: deionized water, non-deionized water, an acid or a mixture thereof. For example, the acid is selected among the following elements: hydrochloric acid, phosphoric acid, sulfuric acid, nitride acid or a mixture thereof.

Optionally, the graphite oxide is dried, for example with air or at high temperature in the vacuum condition.

Preferably in step E.iv), the exfoliation is performed by using ultrasound, mechanical agitator, sieve shaker or thermal exfoliation. Preferably, the mixture obtained in step E.iii) is exfoliated into one or a few layers of graphene oxide.

By applying the method according to the present invention, graphene oxide comprising at least 43% by weight of oxygen functional groups and having an average lateral size up to 100 μm comprising at least one layer sheet is obtained.

FIG. 1 illustrates an example of one layer of graphene oxide according to the present invention. The lateral size means the highest length of the layer through the X axis, the thickness means the height of the layer through the Z axis and the width of the nanoplatelet is illustrated through the Y axis.

Figure 2:
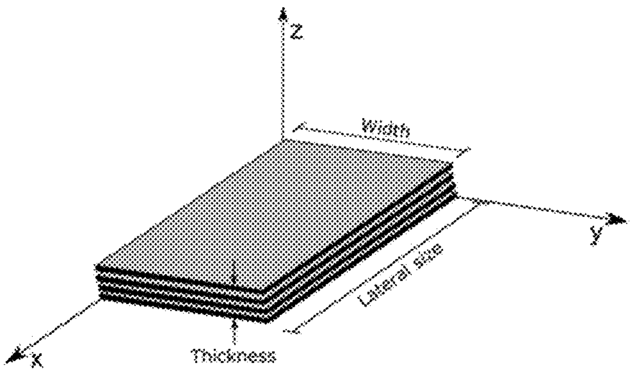
FIG. 2 illustrates an example of a few layers of graphene oxide according to the present invention.

FIG. 2 illustrates an example of a few layers of graphene oxide according to the present invention. The lateral size means the highest length of the layer through the X axis, the thickness means the height of the layer through the Z axis and the width of the nanoplatelet is illustrated through the Y axis.

The obtained graphene oxide has good quality since it is produced from the pre-treated Kish graphite of the present invention. The percentage of oxygen functionalities is high. Thus, the graphene oxide is easy dispersible in water and other organic solvents.

Preferably, graphene oxide is deposited on metallic substrates to improve some properties such as corrosion resistance of metallic substrates.

In another preferred embodiment, graphene oxide is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid can be used to cool down a metallic substrate.

For example, the metallic substrate is selected from among: aluminum, steel, stainless steel, copper, iron, copper alloys, titanium, cobalt, metal composite, nickel.

The invention will now be further explained based on trials carried out for information only. They are not limiting.

EXAMPLES

Trials 1 to 4 were prepared by providing Kish graphite from steelmaking plant. Then, Kish graphite was sieved to be classified by size as follows:

a) Kish graphite having a size below <63 μm and b) Kish graphite having a size above or equal to 63 μm.

The fraction a) of Kish graphite having a size below 63 μm was removed.

A flotation step with the fraction b) of Kish graphite having a size above or equal to 63 μm was performed. The flotation step was performed with a Humboldt Wedag flotation machine with MIBC as frother. The following conditions were applied: Cell volume (l): 2, Rotor speed (rpm): 2000, Solid concentration (%): 5-10, Frother, type: MIBC, Frother, addition (g/T): 40, Conditioning time (s): 10 and Water conditions: natural pH, room-temperature.

All Trials were then leached with the hydrochloric acid in aqueous solution with a ratio in weight acid/kish graphite of 0.5. Trials were then washed with deionized water and dried in air at 90° C. The purity of the kish graphite was of 95%.

After, the kish graphite was intercalated at 25 or 35° C. for 5 minutes with ammonium persulfate and sulfuric acid with different ratios. The mixture was then left in an open vessel for 5 minutes to let the kish graphite expand. The obtained material is called expanded Kish Graphite.

Trials 1 to 4 were mixed at room temperature with sulfuric acid and $KMnO_4$ and optionally ammonium nitrate. The mixture contained 1 part by weight of expanded kish Graphite, 3.5 parts by weight of $KMnO_4$, 100 parts by weight of sulfuric acid and optionally 0.5 part by weight of ammonium nitrate. After the oxidation, the mixtures were gradually pumped into deionized water. $H_2O_2$ in aqueous solution was added until there was no more gas production and mixtures were stirred to eliminate the rest of $H_2O_2$.

Then, for all Trials, graphite oxide was separated from the mixture by decantation. It was then exfoliated using ultrasound in order to obtain one or two layer(s) of graphene oxide. Finally, graphene oxide was separated from the mixture by centrifugation, washed with water and dried with air to obtain graphene oxide powder. Graphene oxide was analyzed by scanning electron microscopy (SEM), X ray diffraction spectroscopy (XRD), Transmission electron microscopy (TEM), LECO analysis and Raman spectroscopy.

Trials 5 and 6 correspond respectively to Trials 1 of WO2018/178842 and Trial 1 of PCT/IB2019/052804. Table 1 shows the results obtained.

The method of Trials 1 to 4 is more environment-friendly than comparative Trials. Moreover, the oxidation time with the method of Trials 1 to 4 is significantly lowered compared to the methods of the prior art illustrated with Trials 5 and 6.

Trials 3 and 4 with the intercalation and expansion steps performed at 35° C. confirmed that ambient temperature or 25° C. (Trials 1 and 2) is enough to obtain graphene oxide comprising a high percentage of oxygen groups.

Trials 2 and 4 with oxidation times of 1 hour confirmed that oxidation times longer than respectively 10 minutes (Trial 1) and 30 minutes (Trial 3) do not improve any further the quality of the graphene oxide. In other words, extremely short oxidation times are enough to sufficiently oxidize the expanded kish graphite. This significantly reduces the energy consumption.

Trials 1 also confirmed that expanded kish graphite can be oxidized without salt even faster than with salt (Trial 3)). The ability to remove the salt from the oxidation step significantly limits pollution.

D. expansion of the intercalated kish graphite at room temperature to obtain expanded kish graphite and E. oxidation of the expanded kish graphite to obtain graphene oxide, wherein step B) includes the following successive sub-steps:

i. a sieving step wherein the kish graphite is classified by size as follows:

a) Kish graphite having a size below 50 μm, b) Kish graphite having a size above or equal to 50 μm, fraction a) of kish graphite having a size below 50 μm being removed, ii. flotation step with the fraction b) of kish graphite having a size above or equal to 50 μm, iii. an acid leaching step wherein an acid is added so that the ratio in weight (acid amount)/(kish graphite amount) is between 0.25 and 1.0, and iv. optionally, washing and drying the kish graphite.

2. The method as recited in claim 1 wherein in step C), the ratio in weight of the persulfate salt with respect to the kish graphite is between 1 and 8.

3. The method as recited in claim 1 wherein in step C), the ratio in weight of the acid with respect to the kish graphite is between 2 and 8.

| Method | | Trial 1* | Trial 2* | Trial 3* | Trial 4* | Trial 5 (Trial 1 of WO2018/178842) | Trial 6 (Trial 1 of PCT/162019/052804) |
|---|---|---|---|---|---|---|---|
| Origin of Kish graphite | | Steelmaking plant | Steelmaking plant | Steelmaking plant | Steelmaking plant | Steelmaking plant | Steelmaking plant |
| Pre-treatment of Kish graphite Sieving step | | Done | Done | Done | Done | Done | Done |
| Inter-calation | Compounds | $(NH_4)_2S_2O_8$ and H2SO4, 25° C. | $(NH_4)_2S_2O_8$ and $H_2SO_4$, 25° C. | $(NH_4)_2S_2O_8$ and $H_2SO_4$, 35° C. | $(NH_4)_2S_2O_8$ and $H_2SO_4$, 35° C. | — | — |
| | Ratio in weight of persulfate salt/kish graphite | 3 | 3 | 3 | 3 | — | — |
| | Ratio in weight of acid/kish graphite | 6 | 6 | 6 | 6 | — | — |
| Expansion | | Static, 25° C. | Static, 25° C. | Static, 35° C. | Static, 35° C. | — | — |
| Oxida-tion step | Mixture | Done with $H_2SO_4$, $KMnO_4$ | Done with $H_2SO_4$, $KMnO_4$ | Done with $H_2SO_4$, $KMnO_4$ and $NH_4NO_3$ | Done with $H_2SO_4$, $KMnO_4$ and $NH_4NO_3$ | Done with $H_2SO_4$ and $NaNO_3$ | Done with $H_2SO_4$ and $NH_4NO_3$ |
| | Oxidation time | 10 minutes | 1 h | 30 minutes | 1 h | 3 h | 1 h 30 min |
| | Element to stop the reaction | Water followed by $H_2O_2$ | Water followed by $H_2O_2$ | Water followed by $H_2O_2$ | Water followed by $H_2O_2$ | Water followed by $H_2O_2$ | Water followed by $H_2O_2$ |
| | Exfoliation | Ultrasound | Ultrasound | Ultrasound | Ultrasound | Ultrasound | Ultrasound |
| Product obtained | | GO comprising 43% of oxygen groups, average Lateral size up to 100 μm, purity of 99.8 % | GO comprising 46% of oxygen groups, average Lateral size up to 100 μm, purity of 99.9 % | GO comprising 47% of oxygen groups, average Lateral size up to 100 μm, purity of 99.7% | GO comprising 45% of oxygen groups, average Lateral size up to 70 μm, purity of 99.8% | GO comprising 40% of oxygen groups, Lateral size from 20 to 35 μm, purity of 99.5% | GO comprising 49% of oxygen groups, average Lateral size from 10 to 20 μm, purity of 99.5 % |

*according to the present invention

What is claimed is:

1. A method for manufacture of graphene oxide from kish graphite, the method comprising:

A. providing kish graphite,

B. pre-treating the kish graphite,

C. intercalation of the kish graphite with a persulfate salt and an acid at room temperature to obtain intercalated kish graphite,

4. The method as recited in claim 1 wherein in step C), the persulfate salt is chosen from the group consisting of: Sodium persulfate ($Na_2S_2O_8$), Ammonium persulfate ($(NH_4)_2S_2O_8$) and Potassium persulfate ($K_2S_2O_8$) and mixtures thereof.

5. The method as recited in claim 1 wherein in step C), the acid is chosen from the group consisting of: $H_2SO_4$, HCl, $HNO_3$, $H_3PO_4$, $C_2H_2Cl_2O_2$ (dichloroacetic acid), $HSO_2OH$ (alkylsulfonic acid) and mixtures thereof.

6. The method as recited in claim 1 wherein in step D), the expansion is naturally performed by leaving the kish graphite, the persulfate salt and the acid at room temperature in an open vessel.

7. The method as recited in claim 1 wherein step E) includes the following successive sub-steps:
   i. mixture of the expanded kish graphite with the or another acid, and an oxidizing agent and optionally a salt,
   ii. addition of at least one chemical element to stop the oxidation reaction,
   iii. separation of graphite oxide from the mixture obtained in step E.ii), and
   iv. exfoliation of graphite oxide into graphene oxide.

8. The method as recited in claim 7 wherein in step E.i), the salt is a nitrate salt chosen from the group consisting of: $NaNO_3$, $NH_4NO_3$, $KNO_3$, $Ni(NO_3)_2$, $Cu(NO_3)_2$, $Zn(NO_3)_2$, $Al(NO_3)_3$ and mixtures thereof.

9. The method as recited in claim 7 wherein in step E.i), the or another acid is chosen from the group consisting of: $H_2SO_4$, HCl, $HNO_3$, $H_3PO_4$, $C_2H_2Cl_2O_2$ (dichloroacetic acid), $HSO_2OH$ (alkylsulfonic acid) and mixtures thereof.

10. The method as recited in claim 7 wherein in step E.i), the oxidizing agent is chosen from the group consisting of: potassium permanganate, $H_2O_2$, $O_3$, $H_2S_2O_8$, $H_2SO_5$, $KNO_3$, NaClO and mixtures thereof.

11. The method as recited in claim 7 wherein in step E.ii), the chemical element used to stop the oxidation reaction is chosen from the group consisting of: an acid, non-deionized water, deionized water, $H_2O_2$ and mixtures thereof.

12. The method as recited in claim 11 wherein at least two chemical elements are chosen to stop the reaction, the two chemical elements being used successively or simultaneously.

13. The method as recited in claim 7 wherein in step E.ii), the mixture obtained in step E.i) is gradually pumped into the chemical element used to stop the oxidation reaction.

14. The method as recited in claim 7 wherein in step E.iii), the graphite oxide is separated by centrifugation, decantation, distillation or filtration.

15. The method as recited in claim 7 wherein in step E.iv), the exfoliation is performed by using ultrasound, mechanical agitator, sieve shaker or thermal exfoliation.

16. The method as recited in claim 1 wherein in step C), the ratio in weight of the persulfate salt with respect to the kish graphite is between 1 and 8, and the ratio in weight of the acid with respect to the kish graphite is between 2 and 8.

17. The method as recited in claim 1 wherein the oxidation lasts for no longer than 10 minutes.

18. The method as recited in claim 1 wherein the intercalation lasts from 2 minutes to 30 minutes.

19. A method for manufacture of graphene oxide from kish graphite, the method comprising:
   A. providing kish graphite,
   B. pre-treating the kish graphite,
   C. intercalation of the kish graphite with a persulfate salt and an acid at room temperature to obtain intercalated kish graphite,
   D. expansion of the intercalated kish graphite at room temperature to obtain expanded kish graphite and
   E. oxidation with an acid, an oxidizing agent and a salt selected from a group consisting of $NH_4NO_3$, $KNO_3$, $Ni(NO_3)_2$, $Cu(NO_3)_2$, $Zn(NO_3)_2$, $Al(NO_3)_3$ and mixtures thereof, of the expanded kish graphite to obtain graphene oxide,
   wherein step B) includes the following successive sub-steps:
   i. a sieving step wherein the kish graphite is classified by size as follows:
      a) Kish graphite having a size below 50 μm,
      b) Kish graphite having a size above or equal to 50 μm,
      fraction a) of kish graphite having a size below 50 μm being removed,
   ii. flotation step with the fraction b) of kish graphite having a size above or equal to 50 μm,
   iii. an acid leaching step wherein an acid is added so that the ratio in weight (acid amount)/(kish graphite amount) is between 0.25 and 1.0, and
   iv. optionally, washing and drying the kish graphite.

20. The method as recited in claim 19 wherein the oxidation lasts from 10 minutes to 1 hour.

21. A method for manufacture of graphene oxide from kish graphite, the method comprising:
   A. providing kish graphite,
   B. pre-treating the kish graphite,
   C. intercalation of the kish graphite with a persulfate salt and an acid at room temperature to obtain intercalated kish graphite,
   D. expansion of the intercalated kish graphite at room temperature to obtain expanded kish graphite and
   E. oxidation, without salt, with an acid and oxidizing agent selected from a group consisting of $KMnO_4$, $H_2O_2$, $O_3$, $H_2S_2O_8$, $H_2SO_5$, $KNO_3$, NaClO or a mixture thereof, of the expanded kish graphite to obtain graphene oxide,
   wherein step B) includes the following successive sub-steps:
   i. a sieving step wherein the kish graphite is classified by size as follows:
      c) Kish graphite having a size below 50 μm,
      d) Kish graphite having a size above or equal to 50 μm,
      fraction a) of kish graphite having a size below 50 μm being removed,
   ii. flotation step with the fraction b) of kish graphite having a size above or equal to 50 μm,
   iii. an acid leaching step wherein an acid is added so that the ratio in weight (acid amount)/(kish graphite amount) is between 0.25 and 1.0, and
   iv. optionally, washing and drying the kish graphite.

22. The method as recited in claim 1 wherein step E) includes the following successive sub-steps:
   i. mixture of the expanded kish graphite with the acid, and an oxidizing agent and optionally a salt,
   ii. addition of at least one chemical element to stop the oxidation reaction,
   iii. separation of graphite oxide from the mixture obtained in step E.ii), and
   iv. exfoliation of graphite oxide into graphene oxide.

* * * * *